July 27, 1965   J. D. STEVENS   3,196,605
HYDRAULIC POWER SYSTEM FOR TRACTORS
Filed July 12, 1963   2 Sheets-Sheet 1
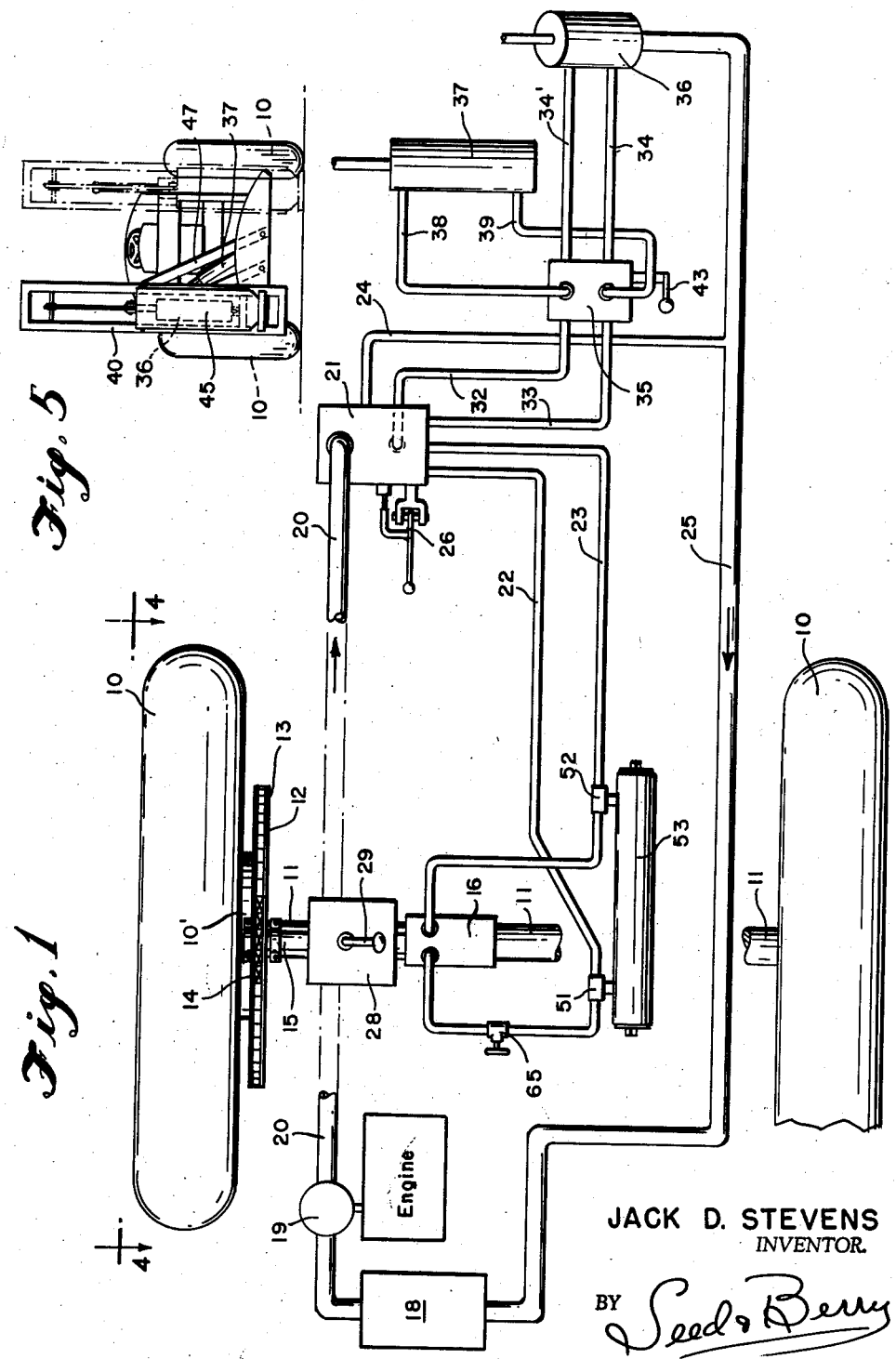
JACK D. STEVENS
INVENTOR.
BY Seed & Berry
ATTORNEYS July 27, 1965  J. D. STEVENS  3,196,605
HYDRAULIC POWER SYSTEM FOR TRACTORS
Filed July 12, 1963  2 Sheets-Sheet 2
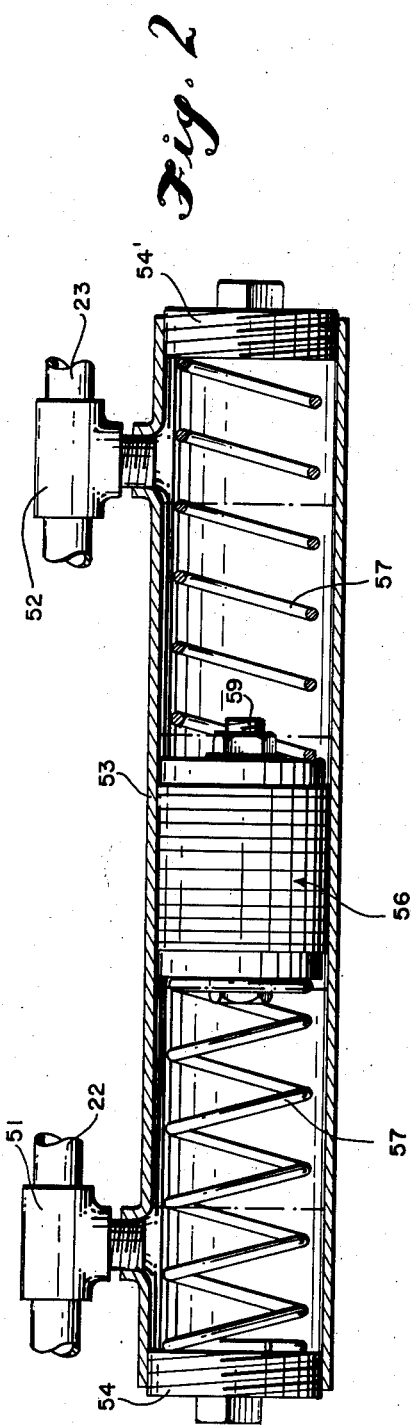
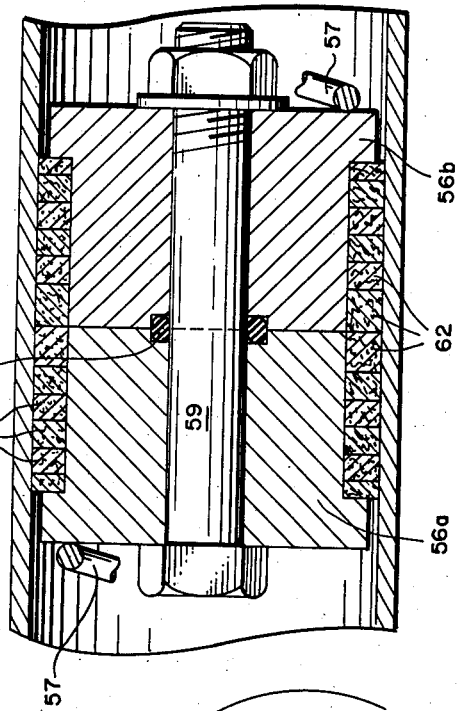
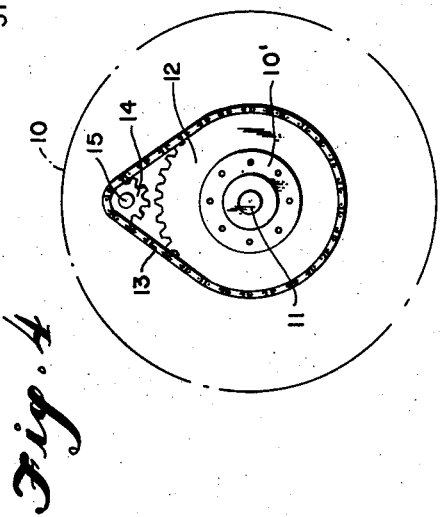
JACK D. STEVENS
INVENTOR.
BY Seed & Berry
ATTORNEYS United States Patent Office 3,196,605
Patented July 27, 1965

3,196,605
HYDRAULIC POWER SYSTEM FOR TRACTORS
Jack D. Stevens, 4797 1st Ave. S., Seattle, Wash.
Filed July 12, 1963, Ser. No. 294,680
3 Claims. (Cl. 60—6)

This invention relates to improvements in hydraulic power systems as employed for the driving of various types of road vehicles; in powered machines; in braking systems and in various forms of power transmission systems where direction of application of power is frequently required.

Explanatory to the present invention, it will here be noted that there are presently in use various types and makes of tractors or the like, that are powered by hydraulic pressure medium that is usually supplied under substantially high pressure to a hydraulically operated motor which has suitable power transmission connections with the driving wheels of the tractor. It is with a tractor of this character, as equipped with a drop hammer operable off of the same hydraulic system that the present invention has been illustrated. While the essence of the present invention resides in a combination of parts as herein shown, it is to be uderstood that it may be advantageously and effectively employed in the hydraulic systems of various other machines for the purpose of absorbing detrimental shock to driving connections, brake systems and controls that occur incident to sudden reversal of power direction or application of brakes. Therefore, it is to be remembered that the illustration of mechanism, particularly as seen in FIG. 1, for drop hammer operation is primarily to illustrate the purpose and use of the invention and not in any way to be considered as a limitation of use.

For better understanding of the present invention and its objects, it will here be pointed out that one mode of drop hammer operation anticipates successive lifting and dropping of the hammer between rapidly initiated intermittent advance movements of the tractor. Furthermore, it is a usual requirement in drop hammer or compactor operations, that the successive advancements of the tractor as effected by the hydraulic medium, be positively checked and held during each hammer lifting and dropping operation.

In the use of a high pressure hydraulic power system for the operation of both the tractor and drop hammer, it is quite detrimental, particularly to the tractor transmission system, to suddenly check and then initiate the hydraulic power applications for alternate period of hammer and tractor operation. Therefore, it has been the primary object of the present invention to equip the hydraulic system as applied for both tractor driving and drop hammer operation with novel shock absorbing means for overcoming or avoiding damage or detriment to the equipment of the tractor by reason of the sudden diversion of high pressure medium from the tractor driving system to the drop hammer actuating mechanism, and vice versa.

More specifically stated, the objects of the present invention reside in the extending of the high pressure hydraulic system, as ordinarily employed for tractor operation, for various other uses such as, for example, the operation of a drop hammer, and to include in the hydraulic system of various vehicles, a novel torque and shock absorber whereby damaging results to power transmission elements, braking elements and the like, are lessened, avoided or eliminated.

It is a further object of the present invention to include in the associated hydraulic systems for tractor and hammer operation, a novel arrangement of valves, in conjunction with flow and pulsation controlling equipment, that are especially advantageous in drop hammer or similar operations.

Still another object of the invention is to provide novel features in the particular shock absorber element as applied to the present hydraulic system.

Further objects and advantages of the invention reside in the detailed construction of the parts embodied in the system, and in their combination, relationship and mode of use, as will hereinafter be fully described.

In accomplishing the above mentioned and various other objects of the invention, I have provided the improved details of construction, the preferred forms of which are illustrated in the accompanying drawings, wherein:

FIG. 1 is a schematic illustration showing the novel features of the present invention as embodied in a hydraulic system serving in both the tractor and drop hammer driving operations.

FIG. 2 is an enlarged, longitudinal sectional view of the shock or torque absorber element employed in the present hydraulic system.

FIG. 3 is an enlarged, sectional detail of the piston contained in the cylinder of the shock absorber element.

FIG. 4 is a sectional detail, taken on line 4—4 in FIG. 1, showing the sprocket wheels employed as a part of the tractor driving connection.

FIG. 5 is an elevational view designed to illustrate lateral shifting of the drop hammer and its guides as mounted on an end of the tractor.

While the following specification will describe a drop hammer operation, it is to be understood that the teaching herein is to apply equally to any similar or analogous operationtion wherein the use of the present shock absorbing element in the hydraulic system is beneficial or advantageous.

Referring more in detail to the drawings:

In FIG. 1, I have shown a schematic arrangement of the hydraulic system of a conventional form of tractor, as extended, in accordance with the present invention, for a drop hammer operation. In this view, I have, for explanatory purposes, shown only the two driving ground wheels 10—10 of the tractor, whereby its travel movements are effected; these wheels being mounted at opposite ends of a vehicle driving cross-axle 11. It is to be understood also that at least one of the driving wheels 10 has a mounting hub 10' on which a large driving sprocket wheel 12 as best shown in FIG. 4, is coaxially fixed. A sprocket chain belt 13 is applied about the sprocket wheel 12 and over a sprocket wheel 14 of smaller diameter fixed on the drive shaft 15 extended from a hydraulically driven motor 16.

Hydraulic pressure medium for operation of the present system is drawn from a tank or source of supply, designated at 18, and forcibly delivered by an engine driven pump 19 through a pipe line 20 to a valve housing 21 from which it may be directed, under manual control, through a distributing pipe line 22, to drive the motor 16 for tractor operation. Return flow of hydraulic medium from the motor 16 to valve housing 21 is through a pipe line 23 thence through a return pipe line 24 that leads from valve housing 21 to a large main return line 25 that empties into the source of supply tank 18.

The flow of hydraulic medium between the valve housing 21 and motor 16 is reversible manually under control of the valve adjusting means designated in FIG. 1 by reference character 26. Such reversal in flow effects change in direction of the driving axle 11 and wheels 10—10 of the tractor. It is shown also in FIG. 1 that the wheel driving axle 11 operates through a transmission gear housing 28 wherein speed changing gears are shiftable by a hand lever 29 for changing the wheel driving gear ratio.

The hydraulic system, as extended for the present hammer operation and control comprises pressure lines 32 and 33 that lead from valve housing 21 to a valve housing 35 from which pressure lines 34—34' lead to a hydraulic cylinder 36 that controls hammer lifting operations. Also, associated with the drop hammer operation, is a hydraulic cylinder 37 with pressure lines 38 and 39 leading thereto from valve housing 35. Cylinder 37 is operable to laterally shift the position of the drop hammer guide frame 40, as has been illustrated in FIG. 5. The diversion of pressure medium from valve 35 to one or the other of cylinders 36 or 37 is under control of a valve lever 43 extended from valve housing 35. When this lever 43 is set in a neutral position, the hydraulic medium supplied from valve housing 21 flows freely through the valve housing 35 and is returned to the source of supply through the valve housing 21 and pipe lines 24 and 25. With the shifting of this lever 43 to right and left, respectively, pressure medium is delivered selectively either to cylinder 36 or cylinder 37 for their functional operations.

The mounting of the drop hammer is illustrated in FIG. 5 wherein the hammer or compactor element 45 is shown as vertically reciprocably movable in a guide frame structure 40. This frame is supported from the end frame of the tractor structure by parallel linkage 47 and may be swung from one position to the other by the hydraulic cylinder 37.

In the use of the system for drop hammer operation, the hydraulic medium supplied under pressure from pump 19 through pressure line 20 to valve housing 21 is diverted, upon proper setting of the valve lever 26, to valve housing 35 and from it to the hammer lifting cylinder 36. Immediately following the lifting and dropping of the hammer, the hydraulic medium under full pressure is diverted to the motor 16 for tractor advancement; the wheel driving force being applied through shaft 15 and sprocket chain 13, to sprocket 14. This abrupt application of force is quite detrimental and would eventually break down the driving connection. It is to avoid the destructive wracking that the present shock absorber element has been installed.

For the installation of the present shock absorbing element in the hydraulic system as shown, I have interposed T-fittings 51 and 52 in the pipe lines 22 and 23, respectively, and by means of these fittings have connected these pipe lines 22 and 23 with opposite end portions of hydraulic cylinder 53 that is fitted at its opposite ends as shown in FIG. 2, with closing plugs 54—54'. Contained in cylinder 53 between its opposite end connections with the pressure pipe lines 22 and 23 is a piston 56 which is acted on at its opposite ends respectively by a pair of balanced coil springs 57—57. The piston separates the bodies of hydraulic medium that are received from the pipe lines 22 and 23.

With the shock absorbing cylinder 53 so installed, it is apparent that when the hydraulic pressure medium in the system is suddenly checked to stop driving of motor 16 in one direction and to reverse it in direction for opposite driving, the shock of reversal will be applied directly against one end of piston 56 and absorbed to substantial amount by the corresponding impact resisting coil spring 57, thus to relieve the driving connection between motor 16 and wheel 10 of detrimental torque or strain. With the understanding that, in the normal operation of the drop hammer with intermittent movement of the tractor, such shocks in a short time will cause damaging of the entire driving system of the tractor. While it is not to be claimed as a feature of this particular invention, it will here be explained that the present system includes, in the valve housing 21, an electrically or pressure controlled timer, not herein shown, that causes the driving pressure medium to be delivered to motor 16, to be advanced in surges; the degree of the surge is established or regulated by the change in adjustment of a hand valve 65, interposed in pipe lines 22. When a surge is so applied as to drive the tractor wheels for timed or periodic tractor advancement, it is checkd with each advancement to avoid hammer actuation. Likewise, when applied for hammer actuation, it is checked against tractor driving.

As a special feature of the construction of piston 56, it is to be observed in FIG. 3 that it comprises a body made of opposite end heads 56a and 56b joined axially by a bolt 59. Between the two heads an O-ring gasket 61 is held under compression and fitted about the two heads are packing rings 62 that prevent leakage past the piston in either direction.

The novel feature of this invention and on which the claims are to be based, resides first in the use with the herein described driving system for a tractor or the like, in conjunction with an additional mechanism requiring a lesser application of power, such as for example, the drop hammer or compactor operation, and to interpose in the hydraulic system, to serve one or both operations, a shock and torque absorber that is designed to eliminate or reduce the shock to driving equipment that is incident to the sudden changes in requirements of sudden applications of a high and low driving pressure in the system. A further advantage is this or any other hydraulic or fluid medium system resides in the device herein designated as a shock absorber, in its application to any fluid medium pressure system, such as in brake lines, power drives and the like wherein pressure medium may be suddenly applied or checked.

What I claim as new is:

1. A wheel mounted vehicle including a vehicle propelling engine, mechanical means interconnecting said engine and vehicle wheels for normally propelling the vehicle, a hydraulic system including an engine driven hydraulic pump, a hydraulically actuated work element mounted on said vehicle, means for controlling the hydraulic actuation of said work element, an auxilary vehicle propelling means, said auxiliary propelling means including a hydraulic motor, supply and relief lines interconnecting said hydraulic motor and hydraulic pump, means interconnecting said hydraulic motor and the vehicle wheels, control means for actuating said hydraulic motor and a hydraulic shock absorbing means interconnected to both of said supply and relief lines between said pump and motor whereby the initial hydraulic pressure from the pump to the motor is of reduced magnitude.

2. A wheel mounted vehicle as in claim 1 wherein said shock absorbing means includes a cylinder, a movable piston in said cylinder, and coiled springs positioned in said cylinder on opposite sides of said piston to yieldingly resist movement of said piston.

3. A wheel mounted vehicle as in claim 1 wherein the control means for actuating said hydraulic motor includes a transmission for altering the speed of the vehicle wheels.

References Cited by the Examiner

UNITED STATES PATENTS

| 2,572,749 | 10/51 | Noordeman | 60—52 X |
|---|---|---|---|
| 2,801,013 | 7/57 | Pilch | 60—52 X |
| 2,827,764 | 3/58 | Simmonds | 60—51 |

FOREIGN PATENTS 396,343   8/33   Great Britain.

JULIUS E. WEST, Primary Examiner.

EDGAR W. GEOGHEGAN, Examiner.